US009033848B2

(12) United States Patent
Deng et al.

(10) Patent No.: US 9,033,848 B2
(45) Date of Patent: May 19, 2015

(54) VEHICLE STARTER AND OVERLOAD-PROTECTION AND DAMPER DEVICE

(71) Applicants: Bosch Automotive Products (Changsha) Co., Ltd., Xingsha, Changsha, Hunan (CN); Robert Bosch GmbH, Stuttgart (DE)

(72) Inventors: Fangmin Deng, Hunan (CN); Ronal Balena, Hunan (CN)

(73) Assignee: Robert Bosch GmbH, Stuttgart (DE)

(*) Notice: Subject to any disclaimer, the term of this patent is extended or adjusted under 35 U.S.C. 154(b) by 11 days.

(21) Appl. No.: 14/162,587

(22) Filed: Jan. 23, 2014

(65) Prior Publication Data

US 2014/0202283 A1 Jul. 24, 2014

(30) Foreign Application Priority Data

Jan. 23, 2013 (CN) .......................... 2013 1 0024872

(51) Int. Cl.

| | |
|---|---|
| ***F16H 57/08*** | (2006.01) |
| ***F02N 15/02*** | (2006.01) |
| ***F02N 11/10*** | (2006.01) |
| ***F02N 15/04*** | (2006.01) |
| ***F02N 15/06*** | (2006.01) |

(52) U.S. Cl.

CPC ................ *F02N 15/02* (2013.01); *F02N 11/10* (2013.01); *F02N 15/025* (2013.01); *F02N 15/046* (2013.01); *F02N 15/063* (2013.01); *F02N 15/067* (2013.01)

(58) Field of Classification Search

USPC ...................................................... 464/42, 43

See application file for complete search history.

(56) References Cited

FOREIGN PATENT DOCUMENTS

DE EP2602504 A1 * 12/2013 ................ F16D 7/02

* cited by examiner

*Primary Examiner* — Robert A Siconolfi
*Assistant Examiner* — Huan Le
(74) *Attorney, Agent, or Firm* — Maginot, Moore & Beck LLP

(57) ABSTRACT

An overload-protection and damper device for a vehicle starter is disclosed, the starter comprising an electric motor and a planetary-gear type speed reducing mechanism coupled with an output shaft of the electric motor. The overload-protection and damper device comprises a ring gear of the speed reducing mechanism, the ring gear having an outer circumference of a frusto-conical shape and defining an axial direction, a holder ring for receiving the ring gear therein, the holder ring having an inner circumference of a frusta-conical shape, with the outer circumference having a cone angle which is substantially equal to that of the inner circumference, and an elastic element applying an axial pushing force to the ring gear towards the holder ring so that the outer circumference biases against the inner circumference, forming a frictional fit therebetween. An increased maximum output torque can be provided by a simple structure.

19 Claims, 2 Drawing Sheets

VEHICLE STARTER AND OVERLOAD-PROTECTION AND DAMPER DEVICE

This application claims priority under 35 U.S.C. §119 to patent application no. CN 201310024872.7 filed on Jan. 23, 2013 in China, the disclosure of which is incorporated herein by reference in its entirety.

TECHNICAL FIELD

The invention relates to an overload-protection and damper device used in a vehicle starter and a vehicle starter comprising such an overload-protection and damper device.

BACKGROUND ART

A motor vehicle generally comprises an electric starter for starting the internal combustion engine of the vehicle. The starter converts electric energy stored in a vehicle battery into mechanical energy for driving the engine to rotate, thereby the engine is started.

The starter mainly comprises a direct-current type electric motor, a transmission mechanism, a control device and the like. When the vehicle engine is to be started, the electric motor is energized by a direct current from the battery to generate a rotational torque. The rotational torque is transmitted to a driven gear on a flywheel of the engine via the transmission mechanism to drive a crank shaft of the engine to rotate. The transmission mechanism comprises a speed reduction mechanism coupled with an output shaft of the electric motor, an overrunning clutch coupled with the speed reduction mechanism, a driving shaft coupled at its back end with the overrunning clutch via a spline, and a pinion mounted to a front end of the driving shaft for driving the driven gear. The driving shaft is axially slidable relative to the overrunning clutch by means of the spline. The control device is configured to control the operation of the electric motor and the axial movement of the driving shaft, so that the pinion is engaged with or disengaged from the driven gear.

When a driver starts the vehicle by an ignition key, the starter is switched on, the pinion is moved forwards with the driving shaft, so that the pinion is engaged with the driven gear, and then the engine is started. Once the rotational speed of the engine is increased to a certain value, the driving shaft moves backwards together with the pinion, so that the pinion is disengaged from the driven gear.

The rotational speed of the internal combustion engine has instability due to structure and operation principle of the engine. Specifically, in the four strokes of the engine, only the expansion stroke contributes to acceleration of the rotation of the internal combustion engine, while the other three strokes all create resistance, not propulsion, to the rotation of the engine. For a four-stroke internal combustion engine, the four strokes are completed by two turns of rotation. During the operation of the starter, the starter generally drives the internal combustion engine until it completes 3 to 4 turns of rotation. In this stage, the starter is subjected to fluctuation in load, and sometimes the load is even a minus load. As a result, the starter is forced to accelerate and decelerate in the procedure of driving the internal combustion engine. In this procedure, the load on the starter may be increased to be more than two times the maximum output torque of the starter. Such a load is the maximum load in the operation of the starter. This maximum load is generally an input parameter in the design of the starter, and is a key factor in determining capacities of components of the starter. There is also another case in which a malfunction may occur in the internal combustion engine or the system of it during the driving procedure of the starter, which may results in abrupt stop or even reverse rotation of the starter. In this case, the internal combustion engine applies an extremely high, or even destructive, impact load to the starter.

Under the same condition, lowering down dynamic load may result in reduced design size of the starter, less strength requirement of parts, and lower product cost. On the other hand, under the condition of the same strength, the service life of the starter can be increased.

In the vehicle starters of prior art, axially engaged friction disks are commonly used for protecting the electric motors. Defects found in such protection means comprise limited torque transmission ability of axially engaged friction disks and relatively complex structure of the protection means itself

SUMMARY OF THE INVENTION

An object of the invention is to provide improved protection means for a vehicle starter to solve the problems existed in prior art.

According to an aspect of the invention, there provides an overload-protection and damper device used in a vehicle starter, the starter comprising an electric motor and a planetary-gear type speed reducing mechanism coupled with an output shaft of the electric motor. The overload-protection and damper device comprises: a ring gear of the planetary-gear type speed reducing mechanism, the ring gear having an outer circumference of a frusto-conical shape and defining an axial direction; a holder ring for receiving the ring gear therein, the holder ring having an inner circumference of a frusta-conical shape, with the outer circumference having a cone angle which is substantially equal to that of the inner circumference; and an elastic element applying an axial pushing force to the ring gear towards the holder ring so that the outer circumference biases against the inner circumference, forming a frictional fit therebetween.

According to a preferred embodiment, the cone angle is in a range of 4 to 40 degrees, preferably 5 to 30 degrees, and most preferably 6 to 20 degrees.

According to a preferred embodiment, the friction coefficient between the outer circumference and the inner circumference is determined in a manner that, when the gear ring is subjected to a torque higher than a threshold, the outer circumference is able to rotate in slippage relative to the inner circumference, and when the gear ring is subjected to a torque lower than the threshold, the outer circumference is fixed relative to the inner circumference.

According to a preferred embodiment, the friction coefficient between the outer circumference and the inner circumference is in a range of 0.05 to 0.4, preferably 0.08 to 0.25.

According to a preferred embodiment, the threshold equals to 1 to 3 times the maximum output torque of the starter.

According to a preferred embodiment, the starter comprises a housing, and the elastic element comprises a disk spring which comprises an outer ring fixed to the housing and an elastic inner ring protruded from the outer ring, the elastic inner ring biasing against the gear ring in an axial direction.

According to a preferred embodiment, the outer ring is clamped between the holder ring and the housing; alternatively, the outer ring is fixed to the housing by fasteners; still alternatively, the outer ring is fixed in the housing by insert molding.

According to a preferred embodiment, the holder ring is formed separately from the housing and is then fixed in the housing; alternatively, the holder ring is formed as an integral portion of the housing.

According to a preferred embodiment, the axial pushing force applied by the elastic element to the gear ring is in a range of 2500 N to 6000 N, preferably 2800 N to 5000 N.

According to a preferred embodiment, at least one of the outer circumference and the inner circumference is formed as a roughened surface and/or formed of a friction material.

According to a preferred embodiment, one of the outer circumference and the inner circumference is composed of a plurality of arc segments separated from each other in the circumferential direction.

According to another aspect of the invention, there provides a vehicle starter which comprises an overload-protection and damper device described above.

According to the invention, by using an overload-protection and damper device which is constructed based on fitting conical friction surfaces, a larger radial restraining force can be provided to the gear ring by means of a smaller axial spring pushing force. In addition, the overload-protection and damper device has fewer components, occupies smaller space, has a lower cost, and is easy to be assembled.

DETAILED DESCRIPTION OF PREFERRED EMBODIMENTS

Some preferred embodiments of the invention will be described now with reference to the drawings.

Figure 1:
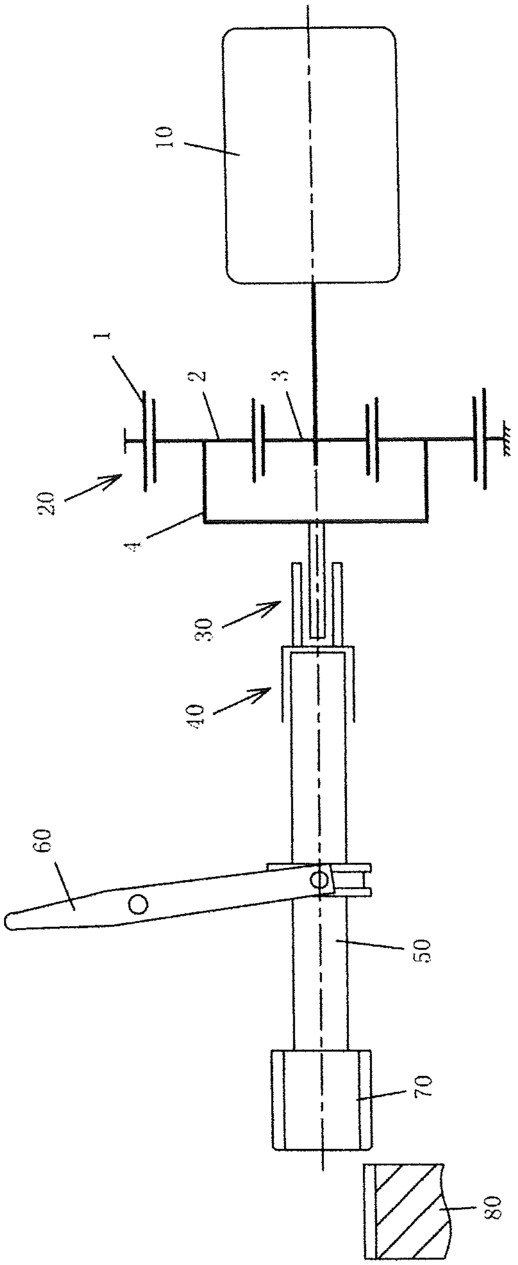
FIG. 1 is a schematic view of a portion of a vehicle starter according to a preferred embodiment of the invention.

FIG. 1 shows a portion of a vehicle starter according to a preferred embodiment of the invention. The starter mainly comprises a direct-current type electric motor 10, a transmission mechanism, a control device and the like.

The electric motor 10 is mounted in a housing (not shown in FIG. 1) of the starter. In the starting procedure of the vehicle engine, the control device supplies a direct current from a battery to the electric motor 10, so that the electric motor 10 operates to generate a rotational torque. The rotational torque is transmitted to a driven gear (generally a gear ring) 80 on a flywheel of the engine via the transmission mechanism to drive a crank shaft of the engine to rotate.

The transmission mechanism mainly comprises a planetary-gear type speed reduction mechanism 20 coupled with an output shaft of the electric motor 10, an overrunning clutch 30 coupled with the speed reduction mechanism 20, a driving shaft 50 coupled at its proximal end, i.e., back end, which is the end proximal to the electric motor 10, with the overrunning clutch 30 via an axially slidable spline 40, a pinion engaging lever 60 configured for driving the driving shaft 50 to slide axially, and a pinion (driving gear) 70 mounted to a front end (the end distal from the electric motor 10) of the driving shaft 50 for driving the driven gear 80.

The output end of the speed reduction mechanism 20 is coupled to an active part of the overrunning clutch 30, while a passive part of the overrunning clutch 30 transmits a rotational movement from the speed reduction mechanism 20 to the driving shaft 50 via the spline 40.

The spline 40 is axially slidable, so that the driving shaft 50 is axially movable. The axial movement is effected by means of the pinion engaging lever 60 of the control device. The pinion engaging lever 60 is pivotable in dual directions around a pivot, which is provided substantially at the middle portion of the pinion engaging lever, to drive the driving shaft 50 to move axially back and forth.

When the driving shaft 50 is at the axially back most position, as shown in FIG. 1, the pinion 70 is disengaged from the driven gear 80 on the flywheel of the engine.

When the starter is initiated to operate, the control device controls the pinion engaging lever 60 to pivot to drive the driving shaft 50 to move forwards, and the pinion 70 is moved forwards together with it so as to be engaged with the driven gear 80. Meanwhile, the control device energizes the electric motor 10, so that the output rotational movement of the electric motor 10 is transmitted to the driven gear 80 via the speed reduction mechanism 20, the overrunning clutch 30, the spline 40, the driving shaft 50 and the pinion 70 in sequence to drive the flywheel of the engine to rotate, and thus the engine is started. Once the engine is started, the control device controls the pinion engaging lever 60 to move the driving shaft 50 backwards, so that the pinion 70 is disengaged from the driven gear 80. Then, the electric motor 10 is de-energized.

Figure 2:
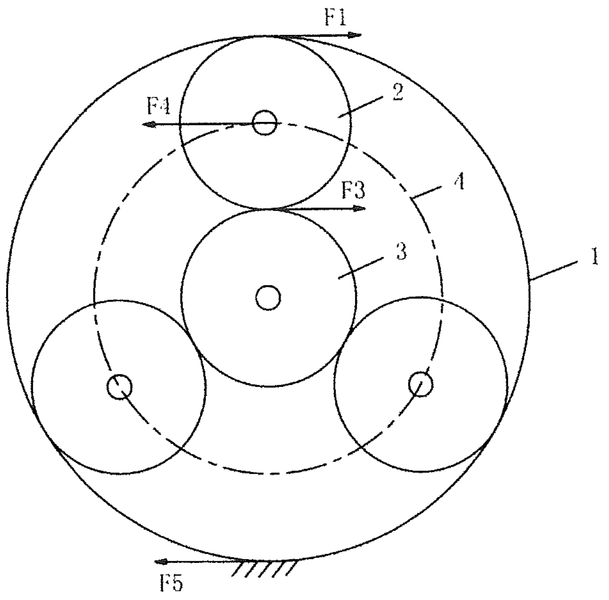
FIG. 2 is a schematic right side view of a planetary-gear type speed reduction mechanism of the starter.

As shown in FIGS. 1 and 2, the planetary-gear type speed reduction mechanism 20 mainly comprises a fixed gear ring 1, a sun gear 3 rotatably disposed in the gear ring 1, at least one planet gear 2 meshed between the sun gear 3 and the gear ring 1, and a rotatable planet carrier 4 carrying the at least one planet gear 2. The gear ring 1, the sun gear 3 and the planet carrier 4 have a common central axis. Generally, for distributing load and improving balance, several planet gears 2, for example, three planet gears 2 as shown in FIG. 2, are disposed between the sun gear 3 and the gear ring 1.

As the input end of the planetary-gear type speed reduction mechanism 20, the sun gear 3 is coupled with the output shaft of the electric motor 10. As the output end of the planetary-gear type speed reduction mechanism 20, the planet carrier 4 is coupled with the overrunning clutch 30.

When the electric motor 10 drives the sun gear 3 to rotate, for example, in the clockwise direction in FIG. 2, the planet carrier 4 is driven to rotate in the same direction, each planet gear 2 is subjected to action forces F1 and F3 from the gear ring 1 and the sun gear 3 at locations engaged with the gear ring 1 and the sun gear 3 respectively, and is subjected to an action force F4 from the planet carrier 4 at center. The action forces F1 and F3 point to the same direction, and the action force F4 points to a direction opposite to that of the action forces F1 and F3, wherein:

$$F1=F3$$

$$F4=F1+F3=2\,F1=2\,F3$$

In addition, the gear ring 1 is fixed to the housing of the starter, and thus is subjected to a tangential action force F5 from the housing, wherein:

$F5=n\times F1$, $n$ being the number of the planet gears 2.

If the numbers of teeth of the gear ring 1, each planet gear 2 and the sun gear 3 are Z1, Z2 and Z3 respectively, and the gear ring 1, the sun gear 3 and the planet carrier 4 are subjected to torques T1, T3 and T4 respectively, then:

$$T4=T1+T3=T1+T1\times Z3/Z1=T1\times(1+Z3/Z1)$$

The invention is to provide an overload-protection and damper device for the starter, which helps to increase the torque transmission ability of the planet carrier 4 by a simple structure.

For this end, according to a basic embodiment of the invention, there provides an overload-protection and damper device incorporated in the planetary-gear type speed reduction mechanism 20, which adopts conical friction surfaces to substitute the axially faced friction surfaces of the friction disks of prior art.

Figure 3:
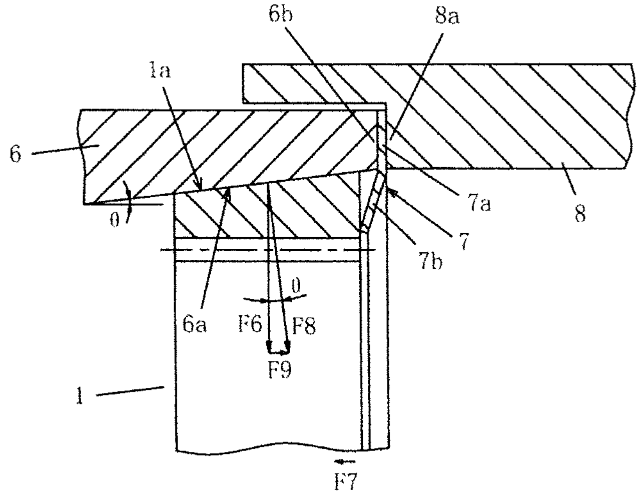
FIG. 3 is a schematic view of an overload-protection and damper device incorporated in the planetary-gear type speed reduction mechanism in the starter.

As shown schematically in FIG. 3, the overload-protection and damper device mainly comprises the gear ring 1 of the planetary-gear type speed reduction mechanism 20, a holder ring 6 holding the gear ring 1 in a manner of permitting slippage therebetween, and a restrain spring 7 biasing the gear ring 1 towards the holder ring 6.

The gear ring 1 comprises an outer circumference 1*a* having a frusto-conical shape orientated in a manner that the front end (the end distal from or facing away the electric motor 10) of the outer circumference 1*a* has a diameter smaller than that of its back end (the end proximal to or facing towards the electric motor 10).

The holder ring 6 comprises a generally ring structure, which is fixed in the housing 8 (FIG. 3 shows a portion of the housing) of the starter. The holder ring 6 comprises a frusto-conical inner circumference 6*a* fitted by friction with the outer circumference 1*a* of the gear ring 1, the front end of the inner circumference 6*a* having a diameter smaller than that of its back end.

The outer circumference 1*a* and the inner circumference 6*a* have the same oblique angle θ, so that the gear ring 1 can rest properly in the holder ring 6.

Further, the diameter of the back end of the inner circumference 6*a* is slightly larger than the diameter of the back end of the outer circumference 1*a*, so that the back end surface of the gear ring 1 is at a position axially forward of the back end surface of the holder ring 6 when the gear ring 1 is in position in the holder ring 6 and the outer circumference 1*a* biases against the inner circumference 6*a*.

The restrain spring 7 is in the form of a disk spring in the illustrated embodiment, which comprises an outer ring 7*a* having a generally planar shape and an elastic inner ring 7*b* having a generally frusto-conical shape and protruded forwards from the outer ring 7*a*. The outer ring 7*a* is clamped between a back end 6*b* of the holder ring 6 and a step 8*a* formed in the housing 8 and facing towards the front direction, whereby the restrain spring 7 is fixed in the housing 8. The elastic inner ring 7*b* biases forwards against the back end surface of the gear ring 1 by an elastic force, so that the outer circumference 1*a* abuts against the inner circumference 6*a* tightly. In this way, the gear ring 1 is clamped between the restrain spring 7 and the holder ring 6, whereby the axial position of the gear ring 1 relative to the holder ring 6 is fixed. In addition, the circumferential position (the position in rotational direction) of the gear ring 1 relative to the holder ring 6 is fixed by the frictional force between the outer circumference 1*a* and the inner circumference 6*a*.

It is appreciated that the restrain spring 7 is not restricted to the illustrated form. Rather, the restrain spring may be a spring element of any suitable form, only if it can apply an axial pushing force to the gear ring 1 towards the holder ring 6.

It is also appreciated that it is not necessary to fix the restrain spring 7 by clamping it between the holder ring 6 and the housing 8. Rather, the restrain spring 7 may be fixed in the housing 8 by any suitable manner or structure, for example, using additional fasteners. Alternatively, in the case that the housing 8 is formed of plastic, the restrain spring 7 may be fixed in the housing 8 by insert molding.

It is also appreciated that, although the holder ring 6 is formed as an element separate from the housing 8 in the illustrated embodiment, the holder ring 6 may be formed as an integral portion of the housing 8 according to an optional embodiment.

It is also appreciated that the orientation of the oblique angle of the outer circumference 1*a* and the inner circumference 6*a* may be opposite from the illustrated one, that is, the two circumferences may be disposed so that their front end diameters are larger than their back end diameters respectively. In this case, the restrain spring 7 may be disposed at the axially front side of the gear ring 1 to apply a pushing force to the gear ring 1 in an axially backward direction towards the holder ring 6.

FIG. 3 schematically shows the forces applied to the gear ring 1. If the restrain spring 7 applies an axially forward pushing force F7 to the gear ring 1, the gear ring 1 is subjected to a normal force F8 at the outer circumference 1*a* from the inner circumference 6*a* of the holder ring 6, and the normal force F8 has a radial component F6 in a radially inward direction and an axial component F9 in an axially backward direction, then:

$$F9=F7$$

$$F8=F9/\sin\theta$$

If the gear ring 1 is subjected to a frictional force f in the rotational direction from the holder ring 6, and the friction coefficient between the outer circumference 1*a* and the inner circumference 6*a* is represented by μ, then:

$$f=F8\times\mu$$

If the gear ring 1 has an average outer diameter R1, then the maximum torque T1max that can be subjected to by the gear ring 1, a torque permitting the gear ring 1 be held by the holder ring 6 without relative rotation (slippage) therebetween, can be expressed by:

$$T1\max=f\times R1=F7\times\mu\times R1/\sin\theta$$

Then, the maximum torque T4max that can be transmitted by the planet carrier 4 is expressed by:

$$T4\max=(F7\times\mu\times R1/\sin\theta)\times(1+Z3/Z1) \quad (1)$$

It can be understood from equation (1) that, for a given spring pushing force F7, in order that the maximum torque T4max that can be transmitted by the planet carrier 4 is increased as high as possible, the oblique angle θ shall be set as small as possible. On the other hand, in order that the gear ring 1 is not completely blocked in the holder ring 6, or in other words, in order that the gear ring 1 can rotate (slip) relative to the holder ring 6 to provide an overload and vibration protection function, when the gear ring 1 is subjected to a torque higher than the maximum torque T1max, the oblique angle θ cannot be set to be indefinitely small. Taken the two and other factors into consideration, the oblique angle θ may be set in a range of 2 to 20 degrees, preferably 2.5 to 15 degrees. In other words, the cone angle (two times the oblique angle θ) of the outer circumference 1*a* and the inner circumference 6*a* may be set in a range of 4 to 40 degrees, preferably 5 to 30 degrees. When the oblique angle θ is within the range of 3 to 10 degrees (that is, the cone angle if in 6 to 20 degrees), best equilibrium can be obtained between the two factors of the torque transmission ability and the protection ability.

It is appreciated that, in order that the gear ring 1 is not completely blocked in the holder ring 6, one of the outer circumference 1*a* and the inner circumference 6*a* may be designed to be non-continuous in the circumferential direction, that is, composed of a plurality of arc segments separated from each other in the circumferential direction.

Further, it can be understood from the above equation (1) that, for increasing the maximum torque T4max, the friction coefficient μ between the outer circumference 1*a* and the inner circumference 6*a* may be increased. The friction coefficient μ may be set in a range of 0.05 to 0.4, preferably 0.08 to 0.25. For increasing the friction coefficient μ, at least one of the outer circumference 1*a* and the inner circumference 6*a* may formed as a roughened surface and/or formed of a friction material to increase the surface roughness of it.

Further, the spring pushing force F7 may be set in a range of 2500 N to 6000 N, preferably 2800 N to 5000 N.

In a particular embodiment of the overload-protection and damper device, the following main parameters are comprised:

F7=5000 N, μ=0.1, R=35 mm, θ=6°, Z1=41 and Z3=13.

It can be calculated out from equation (1): T4max=220 Nm.

Such a maximum torque is sufficient for providing a torque necessary for driving the driven gear 80 on the flywheel of the engine.

The maximum torque T4max that can be transmitted by the planet carrier 4, which is also the maximum torque that can be output by the transmission mechanism of the starter, can be determined by selecting the parameters of the overload-protection and damper device. The maximum torque T4max may be determined to be in a range of 1 to 3 times the maximum output torque of the starter.

During the operation of the starter, when a torque in the planet carrier 4 is continuously higher than the maximum torque T4max (for example, during overload) or a torque (peak torque) in it is instantly higher than the maximum torque T4max (for example, during vibration), the gear ring 1 is able to rotate (slip) relative to the holder ring 6 after overcoming the frictional force between the outer circumference 1*a* and the inner circumference 6*a*. As a result, no extremely high torque can be transmitted to the output shaft of the electric motor 10, and thus the electric motor 10 is protected from damage.

It can be seen that, according to the invention, by using an overload-protection and damper device which is constructed based on fitting conical friction surfaces, a larger radial restraining force can be provided to the gear ring by means of a smaller axial spring pushing force, that is, the transmission mechanism can transmit a higher maximum output torque. In addition, by comparison with prior art, the overload-protection and damper device has fewer components, occupies smaller space, has a lower cost, and is easy to be assembled.

The overload-protection and damper device of the invention is applicable in various vehicle starters, for example, starters of diesel vehicles.

While certain embodiments of the invention have been described here, they are presented by way of explanation only and are not intended to limit the scope of the invention. Various modifications, substitutions and changes can be made by those skilled in the art within the scope and spirit of the invention as defined in the attached claims and their equivalents.

The invention claimed is:

1. An overload-protection and damper device for a vehicle starter, the starter comprising an electric motor and a planetary-gear type speed reducing mechanism coupled with an output shaft of the electric motor, the overload-protection and damper device comprising:

a ring gear of the planetary-gear type speed reducing mechanism, the ring gear having an outer circumference of a frusto-conical shape and defining an axial direction;

a holder ring configured to receive the ring gear therein, the holder ring having an inner circumference of a frusto-conical shape, with the outer circumference of the ring gear having a cone angle which is substantially equal to that of the inner circumference of the holder ring; and an elastic element configured to apply an axial pushing force to the ring gear towards the holder ring so that the outer circumference of the ring gear biases against the inner circumference of the holder ring, wherein the starter comprises a housing, and the elastic element comprises a disk spring which comprises an outer ring fixed to the housing and an elastic inner ring protruding radially inward from the outer ring, the elastic inner ring biasing against the ring gear in an axial direction.

2. The overload-protection and damper device of claim 1, wherein the outer ring is clamped between the holder ring and the housing fixed to the housing by fasteners- or fixed in the housing by insert molding.

3. The overload-protection and damper device of claim 1, wherein the holder ring is formed separately from the housing and is then fixed in the housing or formed as an integral portion of the housing.

4. The overload-protection and damper device of claim 1, wherein at least one of the outer circumference of the ring gear and the inner circumference of the holder ring is one or more of formed as a roughened surface and/or formed of a friction material.

5. The overload-protection and damper device of claim 1, wherein one of the outer circumference of the ring gear and the inner circumference of the holder ring is composed of a plurality of arc segments separated from each other in the circumferential direction.

6. The overload-protection and damper device of claim 1, wherein the axial pushing force applied by the elastic element to the ring gear is in a range of 2500 N to 6000 N.

7. The overload-protection and damper device of claim 6, wherein the axial pushing force applied by the elastic element to the gear ring is in a range of 2800 N to 5000 N.

8. The overload-protection and damper device of claim 1, wherein the cone angle is in a range of 4 to 40 degrees.

9. The overload-protection and damper device of claim 8, wherein the cone angle is in a range of 5 to 30 degrees.

10. The overload-protection and damper device of claim 8, wherein the cone angle is in a range of 6 to 20 degrees.

11. The overload-protection and damper device of claim 1, wherein a friction coefficient between the outer circumference of the ring gear and the inner circumference of the holder ring is determined in a manner that, when the gear ring is subjected to a torque higher than a threshold, the outer circumference of the ring gear is configured to rotate in slippage relative to the inner circumference of the holder ring, and when the gear ring is subjected to a torque lower than the threshold, the outer circumference of the ring gear is fixed relative to the inner circumference of the holder ring.

12. The overload-protection and damper device of claim 11, wherein the friction coefficient between the outer circumference of the ring gear and the inner circumference of the holder ring is in a range of 0.05 to 0.4.

13. The overload-protection and damper device of claim 12, wherein a friction coefficient between the outer circumference of the ring gear and the inner circumference of the holder ring is in a range of 0.08 to 0.25.

14. The overload-protection and damper device of claim 11, wherein the threshold equals to 1 to 3 times a maximum output torque of the starter.

15. A vehicle starter, comprising:

an overload-protection and damper device including:

a ring gear of a planetary-gear type speed reducing mechanism, the ring gear having an outer circumference of a frusto-conical shape and defining an axial direction;

a holder ring configured to receive the ring gear therein, the holder ring having an inner circumference of a frusto-conical shape, with the outer circumference of the ring gear having a cone angle which is substantially equal to that of the inner circumference of the holder ring; and an elastic element configured to apply an axial pushing force to the ring gear towards the holder ring so that the outer circumference of the ring gear biases against the inner circumference of the holder ring; and wherein the starter comprises a housing, and the elastic element comprises a disk spring which comprises an outer ring fixed to the housing and an elastic inner ring protruding radially inward from the outer ring, the elastic inner ring biasing against the ring gear in an axial direction.

16. The vehicle starter of claim 15, further comprising:

an electric motor including an output shaft, wherein the planetary-gear type speed reducing mechanism is coupled with the output shaft of the electric motor.

17. The overload-protection and damper device of claim 15, wherein the cone angle is in a range of 5 to 30 degrees.

18. The overload-protection and damper device of claim 15, wherein the friction coefficient between the outer circumference of the ring gear and the inner circumference of the holder ring is in a range of 0.05 to 0.4.

19. The overload-protection and damper device of claim 15, wherein a friction coefficient between the outer circumference of the ring gear and the inner circumference of the holder ring is determined in a manner that, when the gear ring is subjected to a torque higher than a threshold, the outer circumference of the ring gear is configured to rotate in slippage relative to the inner circumference of the holder ring, and when the gear ring is subjected to a torque lower than the threshold, the outer circumference of the ring gear is fixed relative to the inner circumference of the holder ring.

* * * * *